(12) United States Patent
Roberts

(10) Patent No.: US 7,430,934 B2
(45) Date of Patent: Oct. 7, 2008

(54) CONTINUOUSLY VARIABLE TRANSMISSION (CVT) UTILIZING AN ADJUSTABLE FULCRUM

(75) Inventor: Melvin D. Roberts, Athens, AL (US)

(73) Assignee: Movine Technology Forward, Inc, Jacksonville, AL (US)

( * ) Notice: Subject to any disclaimer, the term of this patent is extended or adjusted under 35 U.S.C. 154(b) by 563 days.

(21) Appl. No.: 10/906,431

(22) Filed: Feb. 18, 2005

(65) Prior Publication Data

US 2006/0199694 A1    Sep. 7, 2006

(51) Int. Cl.
*F16H 29/08* (2006.01)

(52) U.S. Cl. .......................................... 74/117; 74/119
(58) Field of Classification Search ............ 74/116–119
See application file for complete search history.

(56) References Cited

U.S. PATENT DOCUMENTS

| | | | | | |
|---|---|---|---|---|---|
| 1,296,637 | A | * | 3/1919 | Draver ........................ | 74/119 |
| 1,911,156 | A | * | 5/1933 | Laing .......................... | 74/119 |
| 2,618,981 | A | * | 11/1952 | Przybylski .................. | 74/119 |
| 2,691,896 | A | * | 10/1954 | Stageberg ................... | 74/119 |
| 2,706,914 | A | * | 4/1955 | Spence ........................ | 74/113 |
| 3,206,991 | A | * | 9/1965 | Lines et al. .................. | 74/124 |
| 5,603,240 | A | | 2/1997 | Kloustad et al. ............. | 74/120 |
| 5,803,858 | A | | 9/1998 | Haka .......................... | 475/210 |
| 6,575,869 | B2 | | 6/2003 | Ervin .......................... | 476/40 |
| 6,758,111 | B2 | | 7/2004 | Buonauro .................... | 74/119 |
| 6,824,496 | B2 | | 11/2004 | Mason et al. ................ | 476/51 |
| 6,837,818 | B1 | | 1/2005 | Kapaan et al. .............. | 475/210 |
| 6,846,264 | B2 | | 1/2005 | Sugihara ...................... | 476/40 |
| 7,004,487 | B2 | * | 2/2006 | Matsumoto et al. ......... | 280/259 |
| 2004/0003672 | A1 | | 1/2004 | Rubenstein .................. | 74/125 |
| 2004/0157695 | A1 | | 8/2004 | Ashikawa et al. ........... | 475/207 |
| 2004/0171452 | A1 | | 9/2004 | Miller et al. ................ | 475/215 |

\* cited by examiner

*Primary Examiner*—William C Joyce

(57) ABSTRACT

This transmission utilizes an adjustable fulcrum to accomplish variable speed and torque conversion. The component utilizes multiple circular eccentric cams fixed to an input shaft at equal rotational intervals to apply vertical movement to an equal number of perpendicular torque converter shafts spanning the distance between the parallel input and clutch shafts. To provide control, yet allow for free horizontal and rotational movement, the torque converter shafts operate through separate sleeves attached to the cams and to a common adjustable fulcrum located between and parallel to the input and clutch shafts. Output ends of the torque converter shafts are attached, in a pinion fashion, to different unidirectional roller clutches mounted on the clutch shaft. These clutches can then, based upon adjustable fulcrum settings, translate modified cam movements into a wide range of rotary output motions with an infinite number of speed and torque ratios.

1 Claim, 2 Drawing Sheets

CONTINUOUSLY VARIABLE TRANSMISSION (CVT) UTILIZING AN ADJUSTABLE FULCRUM

BACKGROUND OF THE INVENTION

1. Field of Invention

This invention relates to a continuously variable transmission (CVT) that utilizes an adjustable fulcrum to vary the output to input ratio instead of gears or frictional means such as belt or toroidal systems.

2. Description of the Related Art

Existing use of automatic or manual transmissions consists of varied combinations of gears, bands, and clutches to produce a predefined number of fixed gear ratios. Many of these types of transmissions, especially automatics, are heavy, complex, and expensive—while also lacking in efficiency due to the limited fixed gear ratios. In contrast, the emerging continuously variable transmission technology offers a wide range of infinite speed and torque ratios, while increasing fuel efficiency and reducing weight, complexity, and costs. Estimates indicate that the new technology will be able to increase fuel efficiency by as much as two miles per gallon and reduce the number of transmission parts required by over 40 percent. Such a reduction in overall costs should create a tremendous future market for this growing technology.

These new transmission types have improved to the point where most of the major automobile manufacturers are currently offering limited options to customers who want an automobile utilizing this advanced technology. Types of continuously variable transmissions that are offered vary, but consist primarily of versions of the belt and pulley or toroidal types. Although improvements have been made in these types of friction systems to accommodate larger torque requirements, they likely will require additional significant improvements before they are generally accepted by automobile owners as preferred and practical transmission systems.

The belt and pulley type transmission works on the principle of a fixed length belt connecting sloped surface input and output pulleys with variably controlled groove widths. As the groove width in the drive pulley decreases, the belt on that pulley is forced toward the outside circumference of the pulley. At the same time the output pulley is increased in width in an amount that will keep the belt tight while allowing the belt on that pulley to move toward the center circumference of the pulley—thus the combined actions result in an increase in output speed. Opposite actions on the same pulleys will result in a decrease in output speed—thus providing continuously variable speed and torque ratios.

The belt and pulley principle might appear to be ideal, but because the belt must be very strong and grip to the pulleys very tightly, this type of transmission has not proven highly practical, especially in high torque applications.

The toroidal type CVT involves two metal disks facing each other—one a drive disk and the other an output disk. Two idler wheels are inserted between the disks—one on each side of the input shaft. These idler wheels are made and controlled so that they can be set at an angle that will allow one side of the idler wheel to run closer to the center of one disk while at the same time allowing the other side of the same wheel to run closer to the outside of the opposing disk, or vice versa—thus variably controlling the speed ratio of the output disk.

Many more patents have been issued on non-belt type transmissions than for belt types, but many of these face some of the same problems encounter by the belt types—mainly slippage, component wear, reliability, and limited torque capability.

Although many of the previously patented continuously variable transmissions offer many interesting and varied approaches to solving this complex problem of variable torque conversion, I believe the approach demonstrated by this invention, even if not ever implemented as proposed, offers a completely new avenue for research and discovery. While all gear boxes operate to some extent on the leverage principle, reasonable research failed to identify any previous CVT patents using a circular eccentric cam, torque converter shaft, and adjustable fulcrum to create a variable vertical "seesaw" action in the torque converter shaft that is then converted into rotary output motion by a unidirectional roller clutch.

BRIEF SUMMARY OF THE INVENTION

This invention can support large torque requirements required for larger automobiles, large trucks, tractors, or other heavy machinery because, unlike most current CVT versions, the inherent problems of friction wear and possible slippage in the drive components when heavy torque is applied is eliminated.

The invention has an input shaft that has eight circular cams eccentrically attached. Before being permanently attached, each cam is rotated on the shaft 45 degrees more than the previous cam so that every 45 degrees of rotation of the drive shaft produces a maximum vertical action in one of the eight cam assemblies (360 degrees divided by 8 cams=45 degrees). This vertical movement of the cam also produces a "seesaw" movement on one end of a connected torque converter shaft that goes through the fulcrum assembly and then to the output clutch assembly. Although the maximum vertical action by the cam is fixed, the placement of the fulcrum assembly determines the amount of vertical movement present at the opposite end of the torque converter shaft that is connected to the output clutch assembly. The resulting vertical action at the output clutch connection is then translated to a rotary action by the unidirectional clutch. When the end of the attached shaft goes up, the clutch engages and the clutch shaft turns clockwise; then, when the shaft goes down, the clutch disengages and freely rotates back to start the next engagement cycle.

BRIEF DESCRIPTION OF DRAWINGS

A general understanding of the manual operation and technical aspects of this invention will be readily apparent after reviewing the following referenced detailed descriptions and attached drawings.

DETAILED DESCRIPTION OF INVENTION

Figure 1:
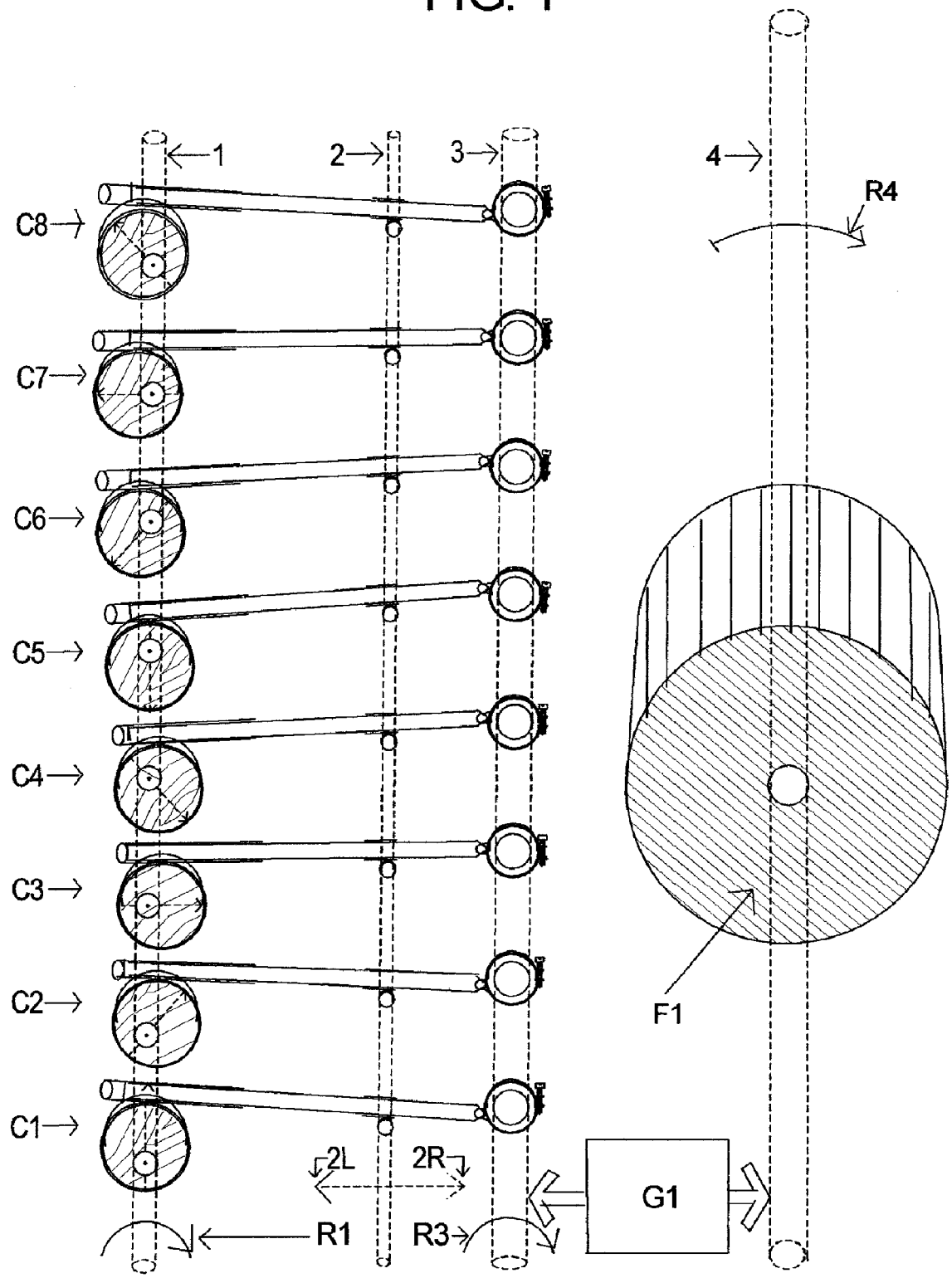
FIG. 1 provides an elevated, functional representation of the present invention with each of the eight torque converter assemblies C1 through C8 shown sufficiently elevated, or separated, to provide a clear frontal view of each.
Figure 2:
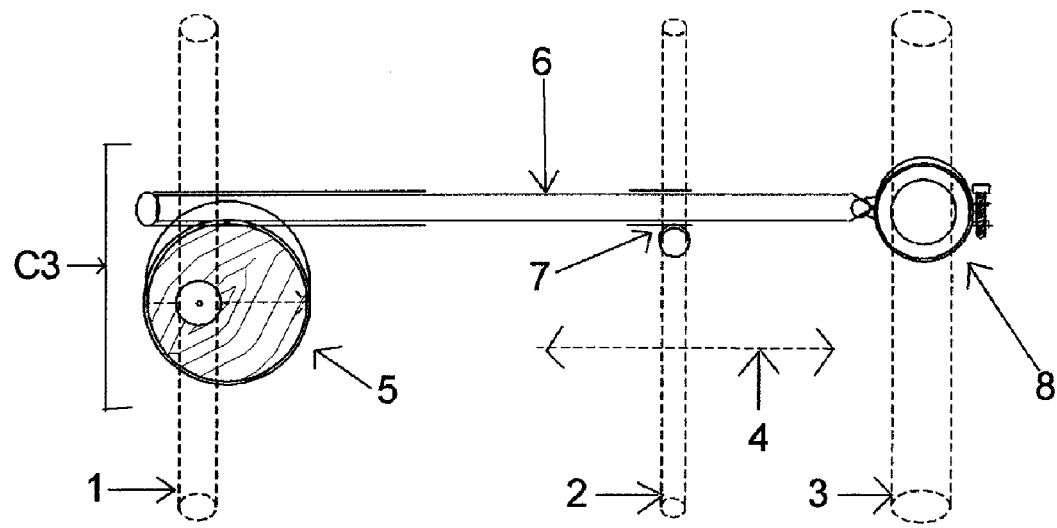
FIG. 2 depicts separately the torque converter assembly C3 of FIG. 1, which was selected to be representative, both physically and descriptively, of all the other seven torque converter assemblies within the invention.
Figure 3:
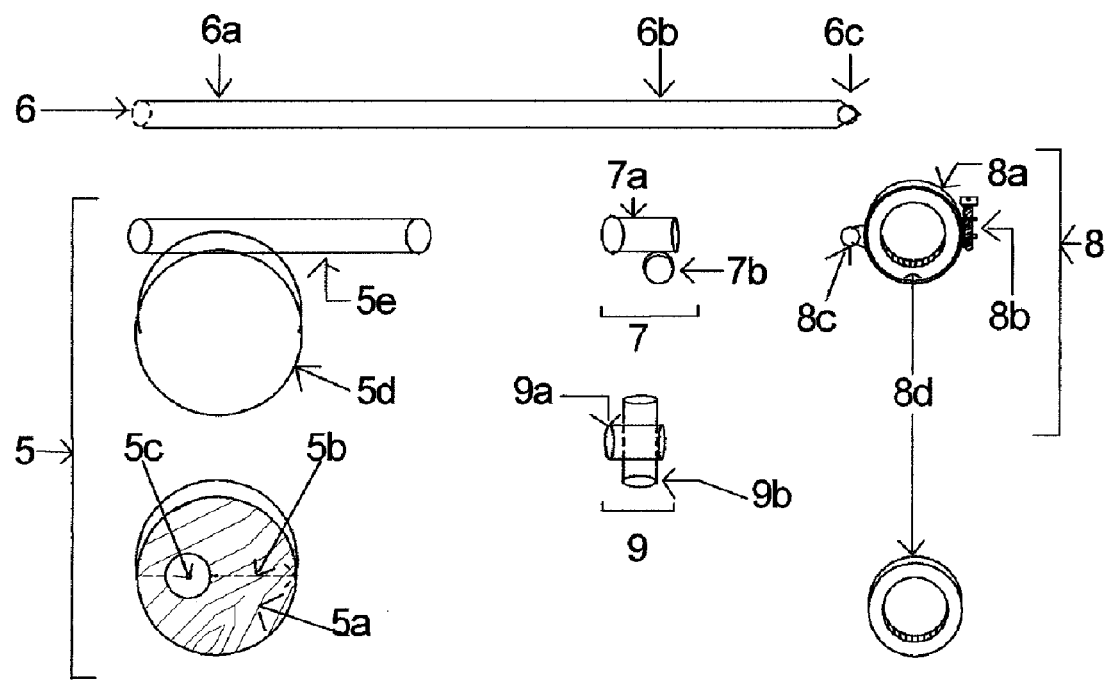
FIG. 3 depicts separately the individual parts and reference numbers associated with not only the torque converter assembly C3 but all the other torque converter assemblies as well. Since all torque converter assemblies are identical except for the rotational angle of each cam on the input shaft, use of any reference number is intended to apply to each and every torque converter assembly unless the reference is qualified to a specific assembly—such as part 5 of C3.

Although a production version of this invention would require precision hard steel construction on a much larger scale with all moving parts immersed in an appropriate transmission lubricant, parts used in the feasibility model were constructed of softer more readily available materials sufficient only for purposes of demonstrating this CVT concept. All references to descriptions, dimensions, and operations of this invention, unless otherwise noted or obvious, should be assumed to be reasonably correct as they relate to the feasibility model and not to a proposed production model.

Definition of drawing reference numbers are provided below so that the subsequent detailed description of individual parts of the feasibility model and how it works will be more readily understood.

Definition List 1

| Term | Definition |
|---|---|
| 1 | Input shaft, a steel rod .25 inches in dia. and 7.25 inches long. |
| 2 | Fulcrum shaft, a steel rod .1875 inches in dia. and 5.0 to 8.0 inches long based upon adjustment mechanism. |
| 2L | Left movement range limit of fulcrum shaft 2 (fast) |
| 2R | Right movement range limit of fulcrum shaft 2 (slow) |
| 2L<-2R | Movement range (2R = slow, 2L = high) of adjustable fulcrum 2, which is 1.625 inches. |
| 3 | Clutch shaft, a steel rod .375 inches in dia. and 8.0 inches long. |
| 4 | Output shaft, a steel rod .375 inches in dia. and 10.0 inches long. |
| 5 | Cam assembly, comprising a circular cam 5a, cam sleeve bearing 5d, and cam torque converter shaft guide 5e. |
| 5a | Circular cam, .875 inches in dia. and .5 inches thick cut from a .875 inch hardwood dowel stick. |
| 5b | Cam diametrical line, drawn through the center of circular cam 5a to facilitate drilling of the cam input shaft hole 5c. |
| 5c | Cam input shaft hole, .25 inches in dia. and offset .15625 inches from center of circular cam 5a to provide the .3125 vertical cam action. |
| 5d | Cam sleeve bearing, .875 inches I.D. and .5 inches wide cut from a standard copper pipe coupling. |
| 5e | Cam torque converter shaft guide, .1875 inches I.D. and 1.5 inches long cut from standard copper tubing. |
| 6 | Torque converter shaft, a steel rod .1875 inches in dia. and 3.75 inches long. |
| 6a | Torque converter shaft position directly above input shaft 1 where effective vertical movement is applied. |
| 6b | Arbitrary fulcrum shaft position anywhere within fulcrum movement range 2L <- 2R. |
| 6c | Torque converter shaft clutch assembly attachment (pinion type). |
| 7 | Fulcrum guide assembly, comprising fulcrum top guide 7a and fulcrum bottom guide 7b. |
| 7a | Fulcrum top guide, .1875 inches I.D. and .5 inches long cut from standard copper tubing. |
| 7b | Fulcrum bottom guide, .1875 inches I.D. and .5 inches long cut from standard copper tubing. |
| 8 | Clutch assembly, comprising clutch clamp 8a, clutch clamp screw 8b, clutch clamp torque converter shaft attachment 8c, and unidirectional clutch 8d. |
| 8a | Clutch clamp, .75 inch I.D. automotive hose clamp that can be adjusted tightly around the unidirectional clutch 8d. |
| 8b | Clutch clamp screw, provided as part of clutch clamp 8a to secure unilateral clutch 8d in clutch clamp 8a. |
| 8c | Clutch clamp torque converter shaft attachment (pinion type) attached to clutch clamp 8a. |
| 8d | Unidirectional clutch, .375 inches I.D., .625 inches O.D., and .5 inches long. |
| 9 | Top view of fulcrum guide assembly 7 |
| 9a | Top view of fulcrum top guide 7a. |
| 9b | Top view of fulcrum bottom guide 7b. |
| C1-C8 | Torque converter assemblies, each comprising a cam assembly 5, torque converter shaft 6, fulcrum guide assembly 7, clutch assembly 8, and their individual portion of shafts 1, 2, and 3. |
| F1 | Flywheel assembly of adequate weight and diameter to smooth out any jerky motion in output shaft 4. |
| G1 | Gear assembly to provide a 1:1:6 increase in output shaft 4 rotation speed over the input shaft 1 rotation speed while maintaining a clockwise rotation. Because of the approximate 4.5:1 top speed reduction in C1-C8 cam assemblies, gear assembly G1 for the feasibility model required a 1:7.5 ratio to provide the desired R1 to R4 speed ratio of 1:1.6. |
| R1 | Clockwise rotation of input shaft 1. |
| R3 | Clockwise rotation of clutch shaft 3. |
| R4 | Clockwise rotation of output shaft 4. |

The definition list below represents performance results obtained from tests performed utilizing the feasibility model. The speed range is the 1.625 inch distance of the adjustable fulcrum movement from reference point 2R (low range) to point 2L (high range) in FIG. 1. Approximate RPM measurements for each shaft and the overall output ratio is provided for specific percentages of fulcrum movement from zero percent (2R) to 100 percent (2L).

Definition List 2

| Term | Definition | | | |
|---|---|---|---|---|
| Pct movement (2L < 2R) | R1 rpm | R3 rpm | R4 rpm | R1:R4 Ratio |
| 100.0 (2L) | 264 | 57.7 | 433 | .6:1 |
| 75.0 | 273 | 32.8 | 246 | 1.1:1 |
| 50.0 | 277 | 15.4 | 116 | 2.4:1 |
| 25.0 | 279 | 6.2 | 47 | 5.9:1 |
| 12.5 | 280 | 1.8 | 14 | 20:1 |
| 6.25 | 281 | .8 | 6 | 46.8:1 |
| 0.0 (2R) | 281 | .0 | 0 | inf:0 |

The performance statistics displayed in the speed range table above demonstrate the invention's wide range of capability to provide output shaft 4 speeds up to 1.6666 times that of input shaft 1 when run at high speed, and to deliver over 40 times more torque than input shaft 1 when run at the lowest speed.

The primary embodiment of this invention is a power conversion apparatus (transmission) between a primary power source (engine) and the component requiring the converted power (drive shaft).

Since a production model of this invention, although using the same main principles, would be expected to be engineered differently, subject matter which is likely to influence some of these changes is addressed herewith prior to providing a more detailed description of the feasibility model. This information should not only help to better understand the operation of the feasibility model, but also help to anticipate potential engineering changes that could make any future production model better.

The number of torque converter assemblies C1-C8 needed in a production model of this invention is, to some extent, arbitrary; yet, there is a specific number that will provide the smoothest operation and the highest output to input ratio, but implementing it may not be cost effective.

The most effective number of torque converter assemblies C1-C8 is not known by the inventor, but based upon research and tests conducted, the following facts and comments are submitted for consideration in estimating this number:

the feasibility model utilizes eight torque converter assemblies C1-C8;

the feasibility model's top input shaft 1 to clutch shaft 3 speed ratio is about 4.5:1;

there are 360 degrees in one revolution of the clutch shaft 3;

the 360 degree rotation of the clutch shaft 3 divided by the 4.5 top speed reduction could lead one to assume that the eight unidirectional clutches 8d are only effectively engaged a total of about 80 degrees of each revolution;

the 80 degree total clutch engagement divided by the number of torque converter assemblies C1-C8, which is 8, suggests that at top speed each assembly is only effectively engaged for about 10 degrees of each revolution;

if previous assumptions are mostly correct, the minimum fully effective number of torque converter assemblies C1-C8 should be about 36 (360 divided by 10=36 or 8 imes the 4.5 speed reduction=36); and further, if previous assumptions are mostly correct, the top speed reduction in the clutch shaft 3 as a result of the number of torque converter assemblies selected (N) can be determined by dividing N times 10 into 360 (360 divided by the results of 8 times 10=4.5 or 360 divided by the results of 36 times 10=1).

Comments regarding determination of the appropriate number of cam assemblies 5 for a production model, and subsequent mounting of said assemblies, are as follows:

If previous assumptions are mostly correct, a reasonably cost effective approach for building a production model of the invention would be to use 16 torque converter assemblies C1-C8 (10 percent engagement each should result in a 1:2.25 output shaft speed reduction instead of 4.5 with the resulting gear assembly G1 ratio being 1:3.75 instead of 1:7.5);

further, with 16 torque converter assemblies C1-C8, all 16 circular cams 5a could be manufactured identically with the circumference of the cams being polished steel like the crankshaft journals of an automobile engine, with the cam offset input shaft holes 5c being internally splined with 16 grooves; and further, with 16 torque converter assemblies C1-C8, cam portions of the input shaft 1 could be externally splined with 16 grooves to allow each of the 16 cams to be properly rotationally spaced and fixed on the input shaft 1 by rotating and mounting each circular cam 5a one spline groove from the previous circular cam 5a.

With the numbers and mounting methods established for the circular cams 5a of a production model, the following additional information can be considered:

a more practical method for constructing a torque converter assembly C1-C8 in a production model would be to think of it as being similar to the combination of crankshaft journal, bearing and bearing cap, piston rod, wrist pin, and piston in an automobile engine, with the circular cam 5a being the crankshaft journal, the cam sleeve bearing 5d being the bearing and bearing cap, the torque converter shaft 6 being the piston rod, the torque converter shaft clutch assembly attachment 6c being the wrist pin connection, and the clutch assembly 8 being the piston; and Further, the torque converter shaft 6 of a production model would probably need to be modified along with the fulcrum guide assembly 7 to accommodate the tremendous amount of torque expected.

Comments relating to requirements for a flywheel assembly F1 in a production model are as follows:

The invention's flywheel assembly F1 is required for the same reason that a flywheel is required for all combustion engines—to smooth out the jerky crankshaft motions caused by the 3 to 4 power strokes and 3 to 4 compression strokes per revolution of the engine;

further, each power stroke of an automobile engine only delivers diminishing power for a maximum of 180 degrees of each shaft rotation, and then part of that power is absorbed by the flywheel and subsequent compression stroke in preparation for the next power stroke—thus creating jerky rotation speeds which have to be eliminated by using some of the kinetic energy stored in the flywheel during power strokes to assist in maintaining rotation speed during non-power strokes;

further, the engagement of the output clutch 8d is like the power stroke in the engine and the non-engagement of the clutch is like the non-power stroke; and further, the flywheel F1 uses its stored kinetic energy from the engagement part of the rotation cycle to maintain rotation speed during the non-engagement part of the cycle.

Comments regarding the construction and mounting of the cam assemblies 5 in the feasibility model are as follows:

each cam torque converter shaft guide 5e is permanently attached (soldered) to the side of a cam sleeve bearing 5d in a fashion where the said guide is perpendicular to the assumed axis of the cam, the said guide is perpendicular to an imaginary cam diametrical line 5b, and the left end of the said guide is even with the left side of the cam sleeve bearing 5d;

the input shaft 1 passes through the first cam input shaft hole 5c of the circular cam 5a and is permanently secured to the shaft with a pin, through the cam and shaft, at the proper location at 0 degrees rotation;

the remaining 7 circular cams 5a are subsequently attached to the shaft in a similar follow-on fashion, except that each additional cam is rotated 45 degrees clockwise from the previous cam (360 degrees divided by 8 cams=45 degrees);

an additional circular cam 5a can be installed only after the previously installed cam has had its cam sleeve bearing 5d and cam torque converter shaft guide 5e installed; and after installation of all the cam assemblies 5 on the input shaft 1 then the input shaft 1 can be mounted in the transmission case, with all the torque converter shaft guides 5e on top and pointed toward the fulcrum shaft 2.

Construction and mounting comments relating to the torque converter shaft 6 and fulcrum guide assemblies 7 in the feasibility model are as follows:

The fulcrum assembly 7 is constructed by soldering the fulcrum top guide 7a in a "T" fashion on top, and in the center, of the fulcrum bottom guide 7b;

each fulcrum bottom guide 7b (with top guide attached) is mounted on the fulcrum shaft 2 with the fulcrum top guide on top with the leg of the "T" pointing toward the input shaft 1;

the fulcrum shaft 2, with mounted fulcrum guide assemblies 7, is then mounted in the transmission case's unique fulcrum adjustment mechanism, which must be capable of allowing the said fulcrum shaft to move laterally a total of 1.625 inches from the right movement range limit 2R (adjacent to the clutch assembly 8) to the left movement range limit 2L; and the torque converter shaft 6 is installed by inserting the cam assembly 5 end of a torque converter shaft 6 through the fulcrum top guide 7a and then into the cam torque converter shaft guide 5e of the said shaft's matching cam assembly 5.

Comments regarding the construction and installation of the clutch assemblies 8 in the feasibility model are as follows:

each clutch assembly 8 is constructed by soldering, or otherwise permanently mounting, a pinion-type torque converter shaft clutch assembly attachment 8c (engine piston fashion) to the side of a clutch clamp 8a so that the said attachment's wrist pin (small brad) will be parallel to the assumed axis of the output shaft 3 and in line with an imaginary clutch clamp diametrical line, and then, utilizing the clutch clamp 8a with clutch clamp screw 8b, properly orienting and securely installing a unidirectional clutch 8d in the said clutch clamp 8a so that when the unidirectional clutch 8d is rotated clockwise, it will engage the output shaft;

after assembling all the clutch assemblies 8, they are mounted on the clutch shaft 3 with the torque converter shaft clutch assembly attachment 8c of each said clutch assembly 8 facing toward the torque converter shafts 6, and then, the clutch shaft 3 with its installed clutch assemblies 8 is mounted in the transmission case; and after the clutch shaft 3 is installed, each of the torque converter shaft clutch assembly attachments 6c of the torque converter shafts 6 are joined to their matching clutch assemblies 8 by connecting the torque converter shaft clutch assembly attachments 6c in a wrist pin fashion (using small brad) to the clutch clamp torque converter shaft attachments 8c.

Comments regarding the flywheel assembly F1 and gear assembly G1 in the feasibility model are as follows:

the flywheel assembly is mounted in a fixed position on the output shaft 4 and the said shaft is then mounted in the transmission case; and an appropriate gear assembly G1 is installed in the transmission case connecting the clutch shaft 3 to the output shaft 4 to increase the top speed of the output shaft 3 to 1.6 times that of the input shaft 1.

With the assembly methods for the feasibility model complete, a brief description of the model's operation is herewith provided to ensure a fuller understanding.

Comments relating to operation of the torque converter assemblies C1-C8 in the feasibility model are as follows:

when the input shaft 1 turns clockwise, the turning of the eccentric circular cams 5a within the cam sleeve bearings 5d causes the cam assemblies 5 to move up and down, generating a fixed vertical movement in the cam end of the torque converter shafts 6;

The downward motion in the cam end of the torque converter shafts 6, as a result of the fulcrum shaft 2, will then be translated into an upward motion at the clutch assembly 8 ends of such shafts;

Because the clutch assembly ends of the torque converter shafts 6 are connected to the clutch assemblies 8, an upward movement in said end of the shafts will engage the unidirectional clutches 8d and cause the output shaft 3 to turn in a clockwise direction;

as a torque converter shaft's 6 upward motion at the clutch assembly 8 stops, and downward motion starts, its unidirectional clutch 8d disengages (gear overruns shaft) and the clutch returns to its original position to start a new clutch assembly 8 engagement cycle;

the purpose of the adjustable fulcrum shaft 2, utilizing its 1.625 inch lateral movement range (2R to 2L), is to modify the vertical range of motions at the clutch assemblies 8—thus varying the rotation speed and torque of the output shaft 3; and it is important to note that, because there are both right and left balanced lateral forces being applied to the fulcrum shaft, a large amount of effort is not required to modify the fulcrum settings.

Comments regarding the operation of the gear assembly G1 and flywheel assembly F1 in the feasibility model are as follows:

the gear assembly G1 (when utilizing eight torque converter assemblies C1-C8) has a 1:7.5 ratio and is used to increase the speed of the clutch shaft 3 to about 1.6 times that of the input shaft—thus allowing for a generous transmission overdrive speed surplus at the output shaft 4;

the output shaft 4 is installed with a flywheel assembly to help eliminate any jerky motion in the output shaft 4 caused by cyclic engagement and disengagement of the clutch assemblies 8; and the flywheel assembly F1 is more effective on the output shaft 4 than on the clutch shaft 3 because the faster the flywheel turns the more kinetic energy is stored and used to smooth out rotation of the output shaft 4.

While not detracting from the merits of this invention, some of the useful capabilities in existing automobile transmissions not included within the described embodiments of this apparatus, but which must eventually be addressed, are as follows:

the apparatus does not have a reverse capability to allow the output shaft 4 to turn in an opposite direction from the input shaft, but addition of a simple 1:1 ratio reverse capability on the exit end of the existing gear assembly G1 would satisfy this need—thus taking advantage of the capabilities of the said apparatus to determine speeds for both directions based upon adjustable fulcrum settings;

Force can only be applied in one direction through the apparatus, and that is from the input shaft 1 through the torque converter assemblies C1-C8 and then to the clutch shaft 3—thus eliminating the ability to use the power source, such as a combustion engine, to assist in slowing or stopping the continuation of output shaft 4 rotation caused by the kinetic energy stored in the moving vehicle (coasting downhill);

Output shaft 4 and gear assembly G1 can handle rotation forces in either direction, but when an attempt is made to turn clutch shaft 3 in reverse, all the unidirectional clutches 8d will engage—thus locking reverse rotation of clutch shaft 3 and output shaft 4;

When the output shaft 4 is turning faster than the apparatus is operating (vehicle coasting), then the clutch shaft 3 will disengage from all unidirectional clutches 8, allowing the clutch shaft 3 to turn freely within the said clutches with no power being transferred further; and The absence of a braking mechanism during vehicle coasting could be supplemented by utilizing a fixed chassis-mounted fluid type clutch coupling (similar to an automobile torque converter or fan clutch), geared to the output shaft 4 (which could also be part of the gear assembly G1), which would engage during negative torque (coasting) and engage during positive torque (power).

Although this specification is quite lengthy, it will, hopefully, ensure that any interested individual can fully understand all aspects of this invention.

What is claimed is:

1. A continuously variable transmission apparatus to accomplish variable speed and torque conversion comprising:

a splined input shaft, a laterally adjustable fulcrum shaft, and a clutch shaft that are mounted parallel to each other with cam assemblies, fulcrum assemblies, and unidirectional clutch assemblies affixed, in perpendicular alignment, to their respective input, fulcrum, and clutch shafts so that:

aligned sets of said cam, fulcrum, and clutch assemblies are connected in a "see saw" fashion by torque converter shafts that transfer fixed vertical movements of the rotationally spaced cam assemblies through the fulcrum assemblies, on a single adjustable fulcrum shaft, to the unidirectional clutch assemblies on the clutch shaft;

whereby unidirectional clutch assemblies convert the fulcrum assembly modified vertical motions of said torque converter shafts into a corresponding rotation in the said clutch shaft;

whereby said cam assembly is comprised of:
- a circular eccentric cam rotating freely within a sleeve bearing;
- a sleeve torque converter shaft guide securely attached, perpendicular to the input shaft, to the top of the referenced sleeve bearing for connecting a torque converter shaft; and
- a splined input shaft hole in the referenced cam that will allow it, and the other cam assemblies, to be installed on the input shaft at evenly spaced rotational intervals;

whereby said fulcrum assembly is comprised of:
- a fulcrum top guide and a fulcrum bottom guide connected to form a "T" shaped fulcrum assembly where:
  said fulcrum top guide, perpendicular to the fulcrum shaft, is used as a sleeve to guide said torque converter shaft through the entire leg of a "T" shaped fulcrum assembly and over the fulcrum shaft; and
  said fulcrum bottom guide, aligned with the fulcrum shaft, as a sleeve forming the arms of a "T" shaped fulcrum assembly, for insertion of the fulcrum shaft that is used to anchor and support the fulcrum assemblies while allowing free longitudinal movement of said torque converter shaft within said fulcrum top guide, and free rotational movement of said fulcrum bottom guide while mounted on said fulcrum shaft;

whereby each said clutch assembly is comprised of:
- a unidirectional clutch securely mounted within a clutch clamp, and mounted rotationally on the clutch shaft with a wrist pin clutch clamp torque converter shaft attachment on the fulcrum side of the referenced clutch clamp to provide a means for attaching said torque converter shaft, in a pivoting fashion, to said clutch assembly;

Whereby adjusting said fulcrum shaft laterally varies the vertical movement ratios between the cam assembly and the clutch assembly ends of said torque converter shafts, resulting in a corresponding change in the clutch shaft speed and torque ratios.

\* \* \* \* \*